(12) United States Patent
Potash (10) Patent No.: US 11,697,969 B2
(45) Date of Patent: *Jul. 11, 2023

(54) METHOD FOR PREDICTING DRILL BIT WEAR

(71) Applicant: Pioneer Natural Resources USA, Inc., Irving, TX (US)

(72) Inventor: Benjamin Richard Potash, Irving, TX (US)

(73) Assignee: Pioneer Natural Resources USA, Inc., Irving, TX (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/398,845

(22) Filed: Aug. 10, 2021

(65) Prior Publication Data
US 2021/0363833 A1 Nov. 25, 2021

Related U.S. Application Data

(63) Continuation of application No. 16/188,732, filed on Nov. 13, 2018, now Pat. No. 11,125,022.

(Continued)

(51) Int. Cl.
*E21B 12/02* (2006.01)
*G01N 21/95* (2006.01)
(Continued)

(52) U.S. Cl.
CPC ............. *E21B 12/02* (2013.01); *E21B 10/00* (2013.01); *G01N 21/8851* (2013.01);
(Continued)

(58) Field of Classification Search
CPC .......... E21B 12/02; E21B 10/00; E21B 44/00; E21B 10/43; G06T 7/30; G06T 7/001;
(Continued)

(56) References Cited

U.S. PATENT DOCUMENTS 6,186,248 B1 2/2001 Silay et al.
8,738,342 B2 5/2014 Lind et al.
(Continued)

FOREIGN PATENT DOCUMENTS

WO WO-2019087213 A1 * 5/2019 ............ E21B 10/00

*Primary Examiner* — Alicia M. Choi
(74) *Attorney, Agent, or Firm* — Klemchuk PLLC; Keith C. Rawlins (57) ABSTRACT

A system for improving drill bit performance, having processors and memory storing instructions to obtain a wear report for a drill bit, wherein the wear report includes wear characteristics of the drill bit and drill operating parameters under which the drill bit was used; compare the wear characteristics of the drill bit to a threshold for acceptable drill bit wear; and adjust drill operating parameters based on the wear characteristics of the drill bit. The instructions to obtain the wear report for the drill bit include instructions to analyze images of the drill bit to identify wear characteristics; identify wear patterns based on the wear characteristics of the drill bit; identify probable drilling conditions based on the wear patterns; and generate the wear report for the drill bit based on the images of the drill bit, the wear characteristics of the drill bit, and the probable drilling conditions.

17 Claims, 9 Drawing Sheets

Related U.S. Application Data (60) Provisional application No. 62/585,168, filed on Nov. 13, 2017.

(51) Int. Cl.
*G06T 7/00* (2017.01)
*G06T 7/30* (2017.01)
*G01N 21/88* (2006.01)
*E21B 10/00* (2006.01)
*G06F 18/00* (2023.01)
*B23Q 17/09* (2006.01)
*B23B 49/00* (2006.01)

(52) U.S. Cl.
CPC ............ *G01N 21/95* (2013.01); *G06F 18/00* (2023.01); *G06T 7/001* (2013.01); *G06T 7/30* (2017.01); *B23B 49/001* (2013.01); *B23B 2260/144* (2013.01); *B23Q 17/0995* (2013.01); *G01N 2201/10* (2013.01); *G05B 2219/37233* (2013.01); *G06T 2207/10028* (2013.01); *G06T 2207/20081* (2013.01); *G06T 2207/20084* (2013.01); *G06T 2207/30164* (2013.01)

(58) Field of Classification Search
CPC . G06T 2207/10028; G06T 2207/20081; G06T 2207/20084; G06T 2207/30164; G01N 21/8851; G01N 21/95; G01N 2201/10; G06K 9/00; B23B 49/001; B23B 2260/144; B23Q 17/0995; G05B 2219/37233

See application file for complete search history.

(56) References Cited

U.S. PATENT DOCUMENTS

| | | | |
|---|---|---|---|
| 10,953,510 B2* | 3/2021 | Pereira | B23B 49/001 |
| 11,346,215 B2* | 5/2022 | Vempati | E21B 44/00 |
| 2004/0140112 A1 | 7/2004 | Salminen et al. | |
| 2005/0133259 A1 | 6/2005 | Koederitz | |
| 2010/0155149 A1* | 6/2010 | Keshavan | E21B 10/36 |
| | | | 175/428 |
| 2010/0212961 A1* | 8/2010 | Teodorescu | E21B 12/02 |
| | | | 175/39 |
| 2010/0312370 A1 | 12/2010 | Lind et al. | |
| 2011/0174541 A1* | 7/2011 | Strachan | E21B 44/00 |
| | | | 702/9 |
| 2012/0152618 A1 | 6/2012 | Nadeau | |
| 2012/0279783 A1 | 11/2012 | Trinh et al. | |
| 2014/0116776 A1 | 5/2014 | Marx et al. | |
| 2015/0085101 A1 | 3/2015 | Tjhang et al. | |
| 2015/0240617 A1* | 8/2015 | Pelletier | E21B 49/00 |
| | | | 175/41 |
| 2015/0369030 A1 | 12/2015 | Hay et al. | |
| 2016/0047206 A1* | 2/2016 | Vempati | E21B 44/02 |
| | | | 703/7 |
| 2018/0283157 A1 | 10/2018 | Hadi et al. | |
| 2018/0334897 A1* | 11/2018 | Samuel | E21B 7/04 |
| 2019/0030673 A1* | 1/2019 | Pereira | B23Q 17/0995 |

\* cited by examiner

METHOD FOR PREDICTING DRILL BIT WEAR

CROSS-REFERENCE TO RELATED APPLICATION

This application is a continuation of U.S. application Ser. No. 16/188,732 filed Nov. 13, 2018, which claims priority to U.S. Provisional Application No. 62/585,168 filed Nov. 13, 2017, both of which are hereby incorporated by reference in their entireties.

BACKGROUND

This disclosure relates generally to the field of drill bit wear, and more specifically to the field of predicting drill bit wear.

The current dull grading process was developed by the International Association of Drilling Contractors (IADC) in 1987 and is meant to provide a "mental picture" of the wear on a used drill bit. An evaluator visually inspects the used drill bit and describes the observed wear using a standardized eight field code and descriptors. However, the IADC eight field code has poor resolution, accuracy, and repeatability. IADC eight field codes are not easily integrated into other drilling data, which makes advanced analytics for predicting drill bit wear difficult. Further, the determinations of wear are subjective and linear, while oftentimes wear volume is non-linear. The result is that the full value of drill bit forensics is lost. Thus, what is needed is an improved method of determining drill bit wear to facilitate prediction of drill bit wear.

SUMMARY

In one embodiment, a method for improving drill bit performance is described. A method for improving drill bit performance includes obtaining a wear report for a drill bit, wherein the wear report includes wear characteristics of the drill bit and one or more drill operating parameters under which the drill bit was used; comparing the wear characteristics of the drill bit to a threshold for acceptable drill bit wear; and adjusting one or more drill operating parameters based on the wear characteristics of the drill bit. In some embodiments, obtaining the wear report for the drill bit includes analyzing one or more images of the drill bit to identify one or more wear characteristics of the drill bit; identifying one or more wear patterns based on the one or more wear characteristics of the drill bit; identifying one or more probable drilling conditions based on the one or more wear patterns; and generating the wear report for the drill bit based on the one or more images of the drill bit, the one or more wear characteristics of the drill bit, and the one or more probable drilling conditions.

In other embodiments, the method may be embodied in computer executable program code and stored in a non-transitory storage device. In yet other embodiments, the method may be implemented by a system.

DETAILED DESCRIPTION

This disclosure is directed to systems, methods, and computer readable media for improving drill bit performance. A system for improving drill bit performance includes one or more processors and a memory coupled to the processors. The memory stores instructions to obtain a wear report for a drill bit, compare wear characteristics of the drill bit from the wear report to a threshold for acceptable drill bit wear, and adjust drill operating parameters based on the wear characteristics of the drill bit. The memory may also store instructions to analyze images of the drill bit to identify wear characteristics of the drill bit, identify wear patterns based on the wear characteristics of the drill bit, identify probable drilling conditions based on the wear patterns, and generate the wear report for the drill bit based on the images of the drill bit, the wear characteristics of the drill bit, and the probable drilling conditions. The images of the drill bit may be 3D scans of the drill bit before and after use and may be analyzed using image processing or computer vision. The adjustments to the drill operating parameters should improve drill bit performance.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The actions in any particular flow diagram may be presented in a particular order. However, it should be understood that the particular flow of any flow diagram is used only to exemplify one embodiment. In other embodiments, any of the various actions depicted in the flow diagram may not be required, some actions may be performed simultaneously, or other actions may be added, according to various embodiments. In other embodiments, any of the various actions may be taken by alternate components. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art having the benefit of this disclosure.

For purposes of this disclosure, the term 3D scanning system refers to any assembly by which distance data may be collected or calculated and reconstructed to extrapolate the shape of an object. 3D scanning system may refer to any kind of 3D scanning system, including a contact 3D scanner or a non-contact 3D scanner such as a time-of-flight 3D laser scanner, a triangulation 3D scanner, a structured light 3D scanner, and the like. Further, in one or more embodiments, the 3D scanning system may be an internal component of an electronic device or a separate external component connected to an electronic device at will by a user.

Figure 1:
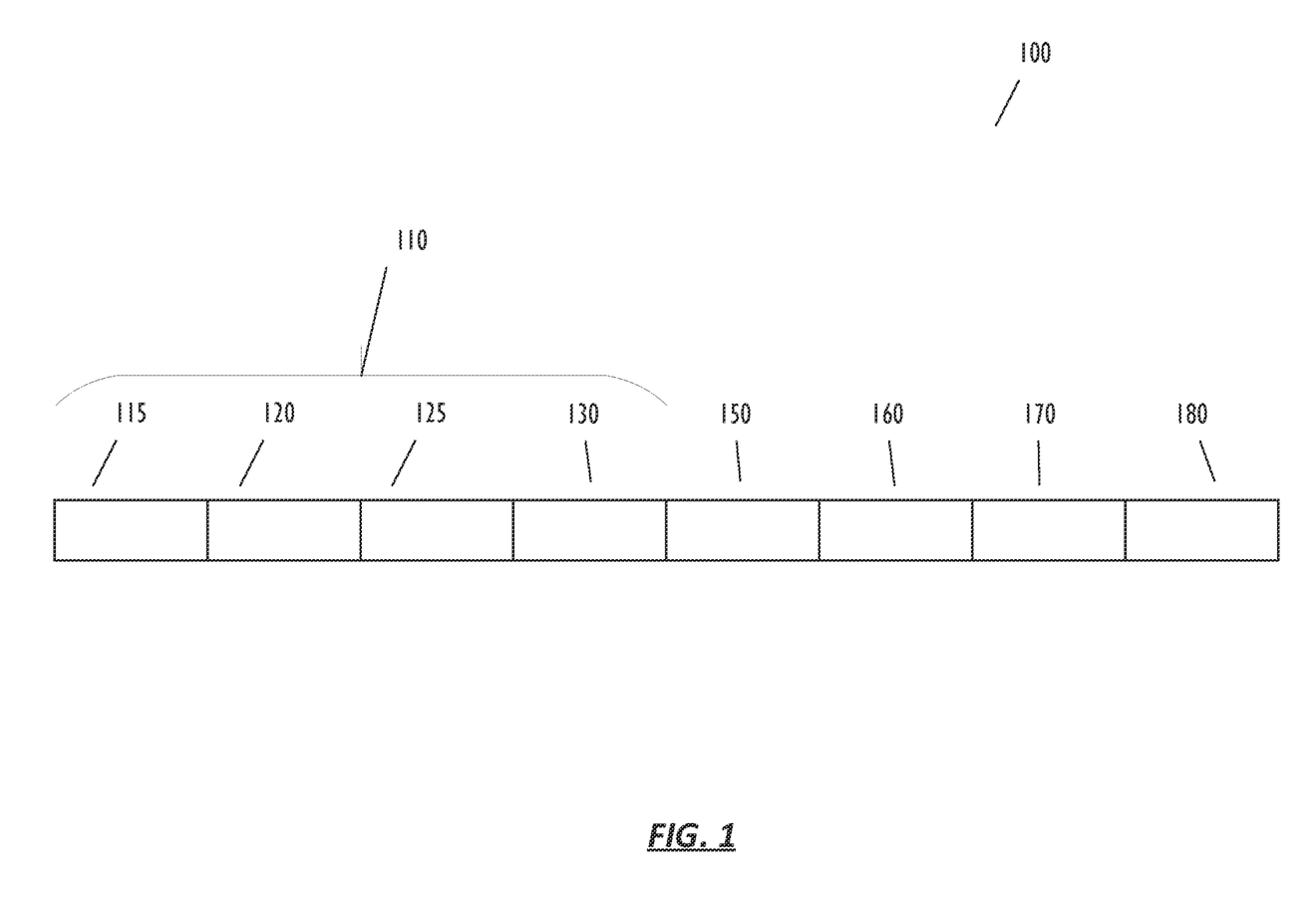
FIG. 1 shows the structure of the IADC eight field code.

Referring to FIG. 1, the structure of an IADC eight field code 100 is shown. The objective of the IADC eight field code is to facilitate the creation of a "mental picture" of wear on a drill bit through an industry-wide standardized evaluation of certain bit characteristics. Eight factors are recorded, one in each field of the code. The first four fields 110 describe the extent and location of wear of the "cutting structure" and include an inner cutting structure field 115, an outer cutting structure field 120, a dull characteristics field 125, and a location on the drill bit field 130. The fifth field 150 describes the bearing wear of roller cone bits and contains an "X" when a fixed cutter bit is used. The sixth field 160 indicates gauge measurement while the seventh field 170 describes other dull characteristics of the drill bit. The eighth field 180 describes the reasons the drill bit was retired from use.

The condition of a used drill bit's inner cutting structure and outer cutting structure is described in fields 115 and 120 with a linear scale of zero to eight. For example, the condition of steel tooth bits is described as a measure of lost tooth height due to abrasion, damage, or both, where zero indicates there has been no loss of tooth height and eight indicates total loss of tooth height. As another example, the condition of insert bits is described as a measure of total cutting structure reduction due to lost, worn, and/or broken inserts, where zero indicates no lost, worn, and/or broken inserts and eight indicates all inserts are lost, worn, and/or broken. As a further example, the condition of fixed cutter bits is described as a measure of lost, worn, and/or broken cutting structure, where zero indicates no lost, worn, and/or broken cutting structure and eight indicates all the cutting structure is lost, worn, and/or broken. The dull characteristics field 125 contains a standardized code describing the type of wear on the drill bit. An example set of standardized codes is shown in Table 1, and a user may select the appropriate descriptive code for the dull characteristics field 125 of the IADC code.

TABLE 1

| BC | Broken Cone | ER | Erosion | PN | Plugged Nozzle/Flow Passage |
|----|----|----|----|----|----|
| BF | Bond Failure | FC | Flat Crested Wear | RG | Rounded Gauge |
| BT | Broken Teeth/Cutters | HC | Heat Checking | RO | Ring Out |
| BU | Balled Up Bit | JD | Junk Damage | SD | Shirttail Damage |
| CC | Cracked Cone | LC | Lost Cone | SS | Self-Sharpening Wear |
| CD | Cone Dragged | LN | Lost Nozzle | TR | Tracking |
| CI | Cone Interference | LT | Lost Teeth/Cutters | WO | Washed Out Bit |
| CR | Cored | OC | Off Center Wear | WT | Worn Teeth/Cutters |
| CT | Chipped Teeth/Cutters | PB | Pinched Bit | NO | No Dull Characteristics |

The fourth field 130 describes the location of the wear on the drill bit. For example, if the drill bit has experienced broken cones, the location field 130 indicates which cone or cones have been broken. Table 2 shows example codes used to indicate the location of the wear on the drill bit.

TABLE 2

| Roller Cone | | Cone | Fixed Cutter | |
|---|---|---|---|---|
| Row | | Number | C | Cone |
| N | Nose Row | 1 | N | Nose |
| M | Middle Row | 2 | T | Taper |
| G | Gauge Row | 3 | S | Shoulder |
| A | All Rows | | G | Gauge |
| | | | A | All Areas |

The fifth field 150 describes the bearing wear of roller cone bits and contains an "X" when a fixed cutter bit is used. For example, the condition of non-sealed bearings is described on a linear scale of zero to eight estimating the bearing life used, where zero indicates no bearing life is used and eight indicates all bearing life has been used and no bearing life remains. As another example, the condition of sealed bearings is described using standardized codes, examples of which are shown in Table 3.

TABLE 3

| E | Seals Effective |
|---|---|
| F | Seals Failed |
| N | Not Able to Grade |
| X | Fixed Cutter Bit (Bearingless) |

The sixth field 160 indicates gauge measurement in fractions of an inch. For example, an I is used where the drill bit is in gauge, $1/16$ is used when the drill bit is $1/16^{th}$ of an inch out of gauge, etc. The seventh field 170 of the IADC code describes additional dull characteristics of the drill bit. This portion of the IADC code provides an opportunity for the user to indicate a secondary dull characteristic to the primary dull characteristic described in the third field 125 of the IADC code and uses the same standardized codes, examples of which are shown in Table 1. The eighth field 180 describes the reasons the drill bit was retired from use or the run terminated using standardized codes, examples of which are shown in Table 4.

TABLE 4

| | | | | | |
|---|---|---|---|---|---|
| BHA | Change Bottom Hole Assembly | CP | Core Point | PR | Penetration Rate |
| DMF | Downhole Motor Failure | FM | Formation Change | RIG | Rig Repair |
| DTF | Downhole Tool Failure | HP | Hole Problems | TD | Total Depth/Casing Depth |
| DSF | Drill String Failure | LIH | Left in Hole | TW | Twist Off |
| DST | Drill Stem Test | HR | Hours on Bit | TQ | Torque |
| DP | Drill Plug | LOG | Run Logs | WC | Weather Conditions |
| CM | Condition Mud | PP | Pump Pressure | | |

As discussed previously, the IADC eight field code is subjective and doesn't provide resolution, accuracy, or repeatability. Without quantitative measurements of wear, two different evaluators may determine two different IADC codes to describe the same drill bit. Evaluators may have less, more, or different training than the next user to determine the IADC eight field code. Further, evaluators are limited to describing only two dull characteristics with the IADC code, regardless of how many are present on the drill bit. Further, the IADC eight field code has poor resolution, in that there may be dozens of cutters within a region with different amounts of wear lumped together under a single IADC code and a single determination of wear. Oftentimes wear volume is non-linear while the IADC dull grading system is linear. In addition, an IADC eight field code is difficult to integrate with other drilling data to provide a holistic view of drill performance and enable advanced analytics for predicting bit wear and optimizing drill bit and drilling parameter selection.

Figure 2:
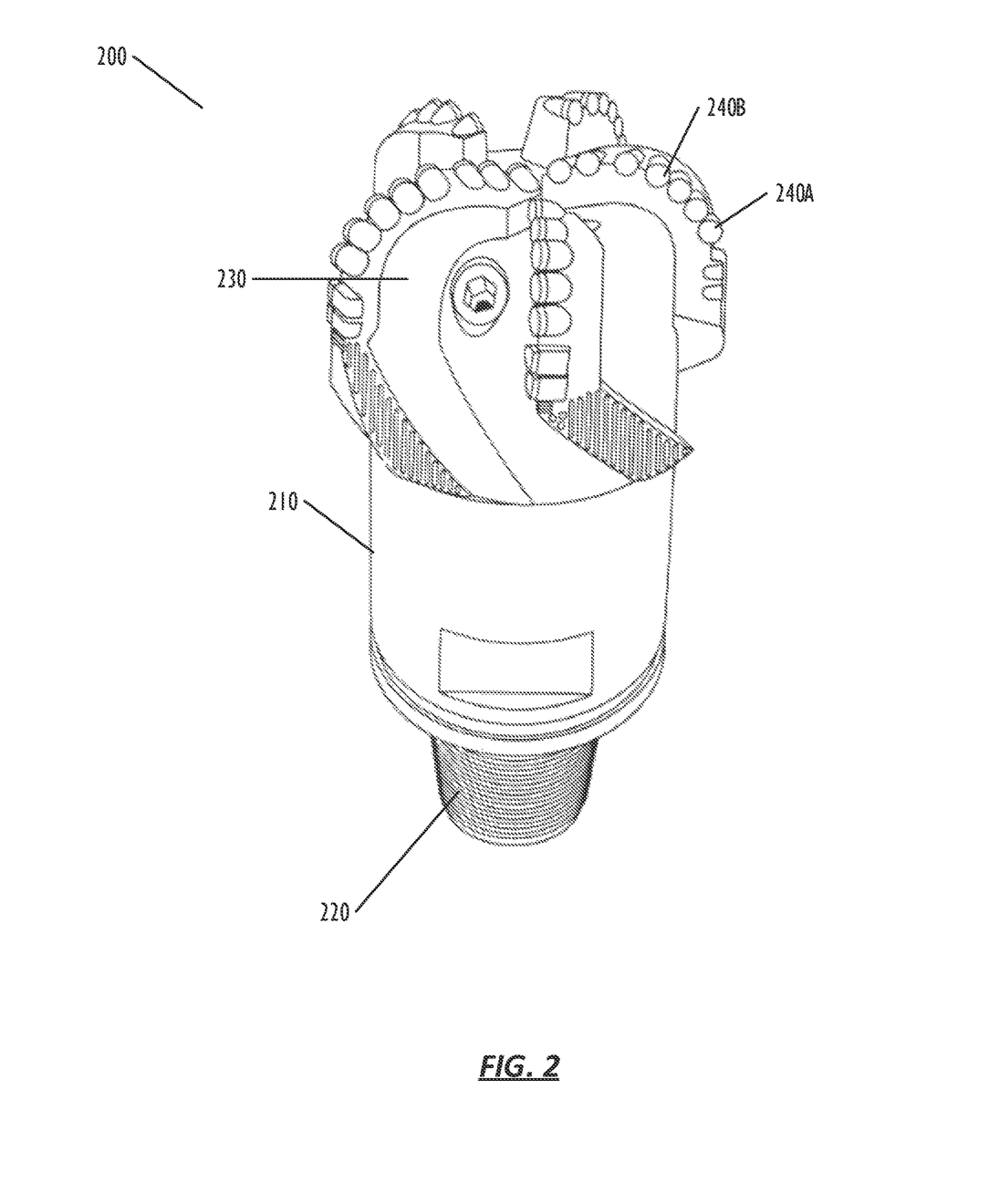
FIG. 2 shows an example drill bit.

FIG. 2 shows an example drill bit 200. Example drill bit 200 includes a bit body 210 which has a threaded connection 220 at one end and a plurality of blades 230 at the other end. The plurality of blades 230 form the cutting surface of drill bit 200 and include a plurality of cutters 240 on each blade 230. The cutters 240 cut through the earth formations when drill bit 200 is rotated during drilling. Drill bit 200 experiences wear over the course of its use and is dull graded to determine the location, severity, and type of wear experienced. From the wear characteristics of the used drill bit, the mechanism by which the wear occurred may be determined, which in turn may be used to improve future drill bit designs or to adjust drilling parameters for improved efficiency and reduced failure rates. Example drill bit 200 is a fixed cutter drill bit, but other types of drill bit may be used, e.g., roller cone drill bits.

Figure 3:
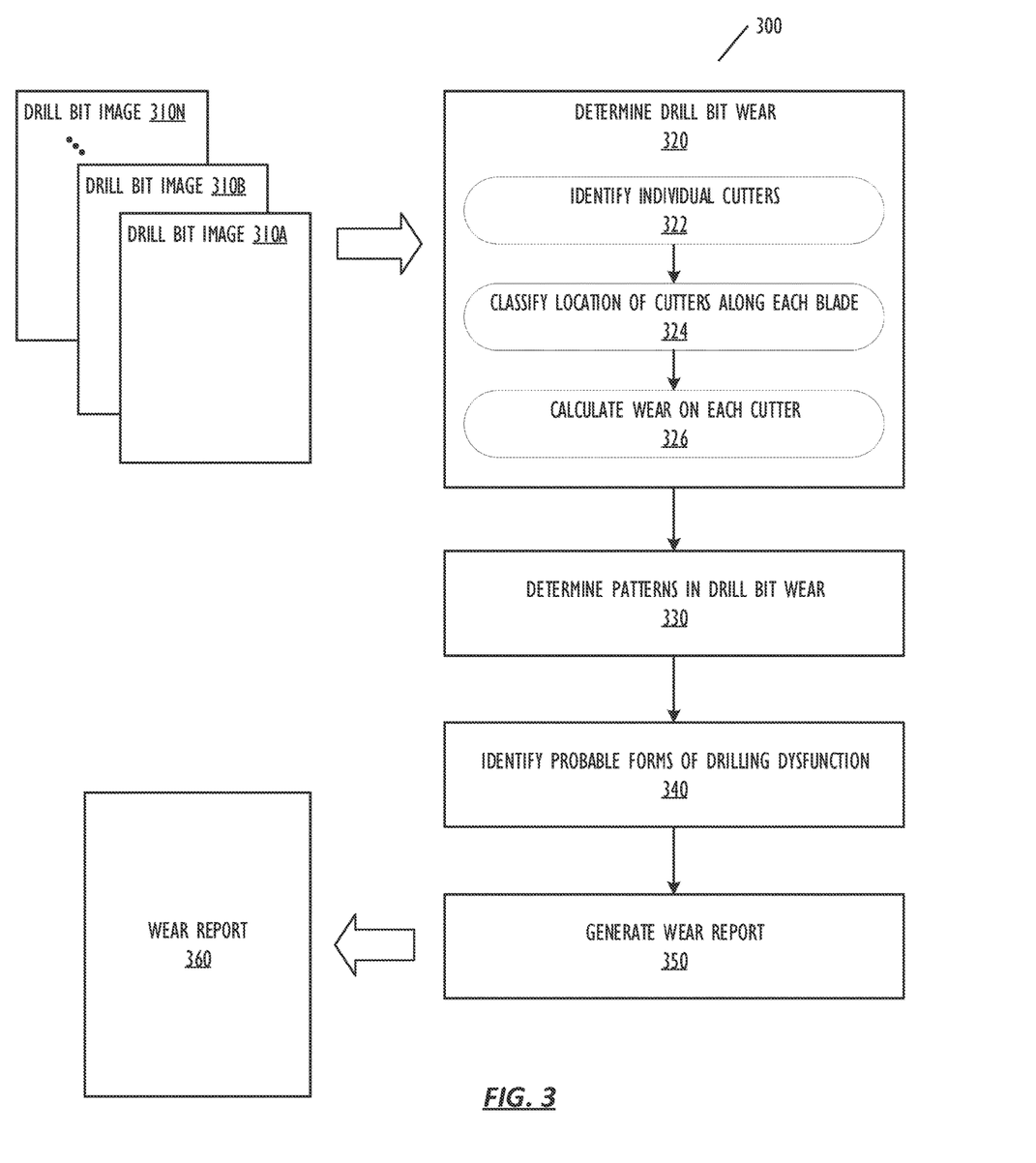
FIG. 3 shows an example process of image analysis to determine drill bit wear, according to one or more embodiments.

Some processes for determining wear characteristics of drill bits are limited to determining an IADC code and capturing images of the top of the drill bit, the side of the drill bit, each blade of the drill bit, and closeups of any particular wear, drill bit images 310A-310N, which are stored with the IADC code describing the drill bit and drill bit use information, such as the well name, drilling assembly number, start and end times and depth, total footage drilled, and the like. FIG. 3 shows an example process 300 for analyzing the captured images of the drill bit 310A-310N to determine drill bit wear, according to one or more embodiments. An image processing module obtains drill bit images 310A-310N and determines drill bit wear based on the images at step 320. In some embodiments, determining drill bit wear at step 320 includes steps 322, 324, and 326. At step 322, the image processing module identifies individual cutters in each drill bit image using any appropriate method, such as edge detection. In some embodiments, image processing module presents the identified cutters to a user for confirmation before proceeding to step 324. At step 324, the image processing module classifies the location of the identified cutters along each blade of the drill bit. For example, the image processing module determines the region of the blade each cutter resides in, such as the cone, nose, shoulder, gauge, etc. In some embodiments, the image processing module allows a user to manually specify transition points between each region of the blade, while in others the image processing module automatically determines transition points between each region of the blade by any appropriate means. At step 326, the image processing module calculates the wear on each identified cutter. For example, where an unused cutter is circular, the image processing module may calculate a circle based on the center location and the expected radius of the cutter and determine the expected number of pixels with which each cutter should be represented. Then, the image processing module may determine the actual number of pixels with which each cutter is represented and calculate a percentage of wear for each cutter based on the actual and expected number of pixels.

At step 330, the image processing module determines patterns in the drill bit wear determined in step 320. Any number of wear metrics may be calculated using the calculated wear for each individual cutter and the region in which each cutter resides, such as overall wear of the drill bit, minimum and maximum values of wear, average wear, wear on each blade, wear on each region, and the like. At step 340, the image processing module identifies probable forms of drilling dysfunction and other less than optimal drilling conditions based on the patterns of drill bit wear determined in step 330. For example, if at step 330 the image processing module determines the drill bit has moderate wear in the gauge region, the probable form drilling dysfunction it will identify in step 340 is whirl. At step 350, the image processing module generates a wear report 360 for the drill bit. In some embodiments, wear report 360 includes a header summarizing key metadata about the drill bit, ranked distributions of wear in each region, and drill bit images 310A-310N with the wear of each individual cutter in each drill bit image. In some embodiments, the header includes the drill bit make, model, and serial number, the depth drilled, the start and stop dates and times, the configuration of drilling parameters used, expected lithology, and the like. Wear report 360 may be any format for ease of integration and analysis with other drilling data.

Figure 4:
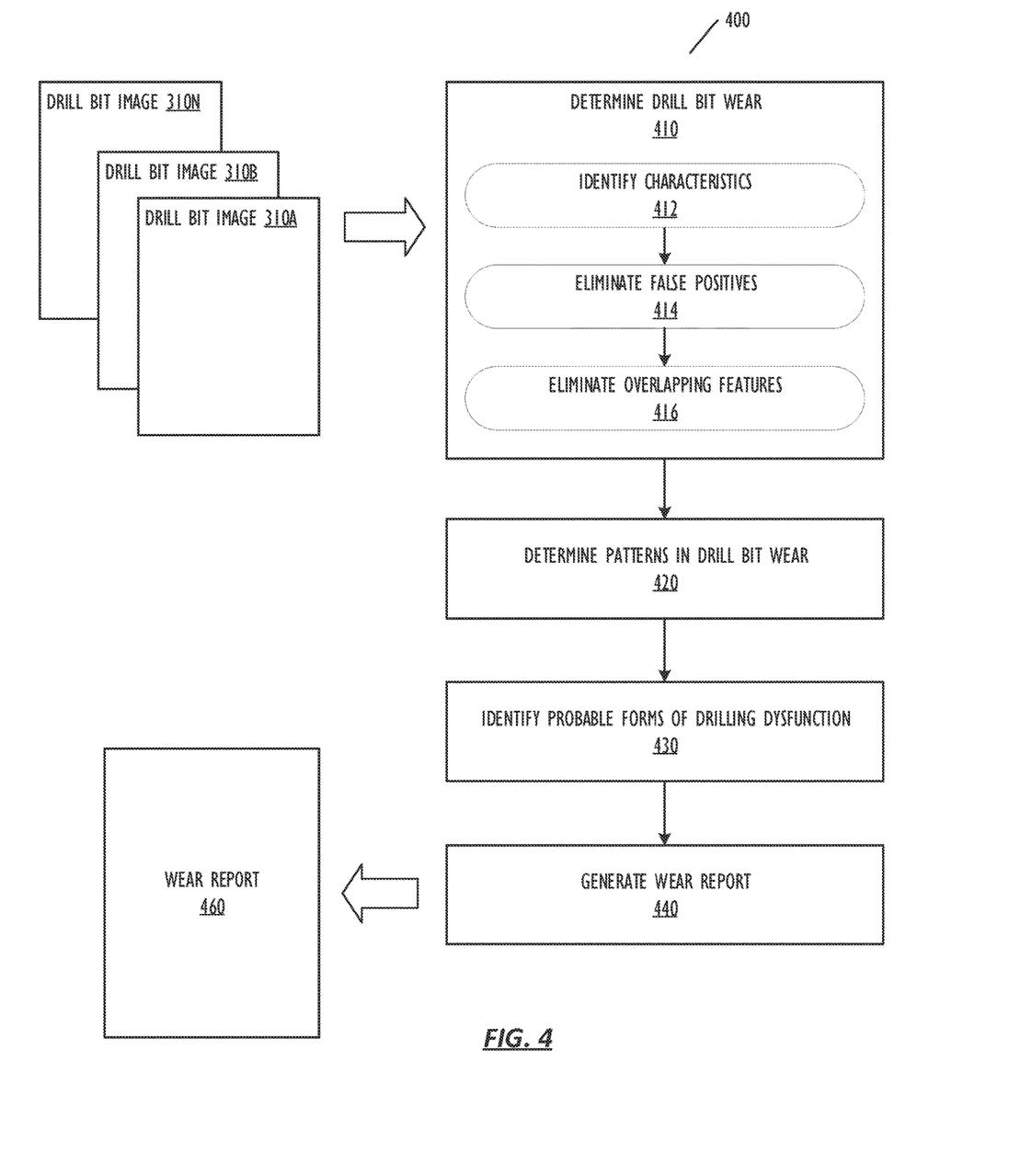
FIG. 4 shows an example process of computer vision analysis to determine drill bit wear, according to one or more embodiments.

FIG. 4 shows an example process 400 for analyzing drill bit images 310A-310N using computer vision to determine drill bit wear, according to one or more embodiments. A computer vision module obtains drill bit images 310A-310N and determines drill bit wear based on the images at step 410. The computer vision module includes any appropriate machine learning modules for classifying dull characteristics. In one embodiment, the computer vision module includes one or more neural networks trained to identify one or more wear characteristics, such as nozzles, primary cutters with no wear, backup cutters with no wear, trim cutters with no wear, broken cutters, worn cutters, lost cutters, delaminated cutters, non-cutting elements, and the like. The one or more neural networks may be trained by any appropriate method, such as from scratch using only training images with the wear characteristics or by retraining an existing neural network to identify the wear characteristics. The one or more neural networks may classify the whole image or regions within the image. In one embodiment, a separate region-focused neural network is used for each wear characteristic, resulting in a number of region-focused neural networks equal to the number of wear characteristics to be identified in each image.

In some embodiments, determining drill bit wear at step 410 includes steps 412, 414, and 416. At step 412, the machine learning modules included in the computer vision module identify wear characteristics in each drill bit image. At step 414, the computer vision module eliminates false positives from the wear characteristics identified in step 412. In one embodiment, the machine learning modules output a confidence score between zero and one associated with each identified wear characteristic and the computer vision module filters the identified wear characteristics based on the associated confidence score and a threshold confidence score. Different threshold confidence scores may be used for each wear characteristic, based on the number of training images for the wear characteristic, the uniqueness of the wear characteristic, and the like. For example, nozzles are a unique feature and a large number of training images are available so the nozzle characteristic is associated with a threshold confidence score of 0.95. In contrast, broken cutters and worn cutters look similar and the machine learning modules struggle to distinguish the two characteristics, so the broken cutters and worn cutters characteristics are associated with a threshold confidence score of 0.7 and 0.8, respectively. In some embodiments, the computer vision module presents the identified wear characteristics to a user to eliminate false positives. At step 416, the computer vision module eliminates overlapping features. Where the machine learning modules identify wear characteristics independently, the same portion of a drill bit image may be identified as multiple characteristics. In some embodiments, the computer vision module eliminates overlapping features by ranking the identified characteristics by confidence score, calculating the overlap ratio between the identified characteristics, and eliminating the identified characteristic associated with a lower confidence score when the overlap ratio exceeds a threshold value.

At step 420, the computer vision module determines patterns in the drill bit wear determined in step 410. As described previously with reference to FIG. 3, the computer vision module may sort the identified wear characteristics into regions and calculate any number of wear metrics, such as the number of instances for each wear characteristic. At step 430, the computer vision module identifies probable forms of drilling dysfunction and other less than optimal drilling conditions based on the patterns of drill bit wear determined in step 420. For example, if at step 420 the computer vision module determines the drill bit has moderate wear in the gauge region, the probable form of drilling dysfunction it will identify in step 430 is whirl. At step 440, the computer vision module generates a wear report 460 for the drill bit. In some embodiments wear report 460 includes a header summarizing key metadata about the drill bit, ranked distributions of wear in each region, drill bit images 310A-310N, and the identified wear characteristics in each drill bit image. As described previously with reference to FIG. 3, in some embodiments the header includes the drill bit make, model, and serial number, the depth drilled, the start and stop dates and times, the configuration of drilling parameters used, expected lithology, and the like. Wear report 460 may be any format for ease of integration and analysis with other drilling data.

Figure 5:
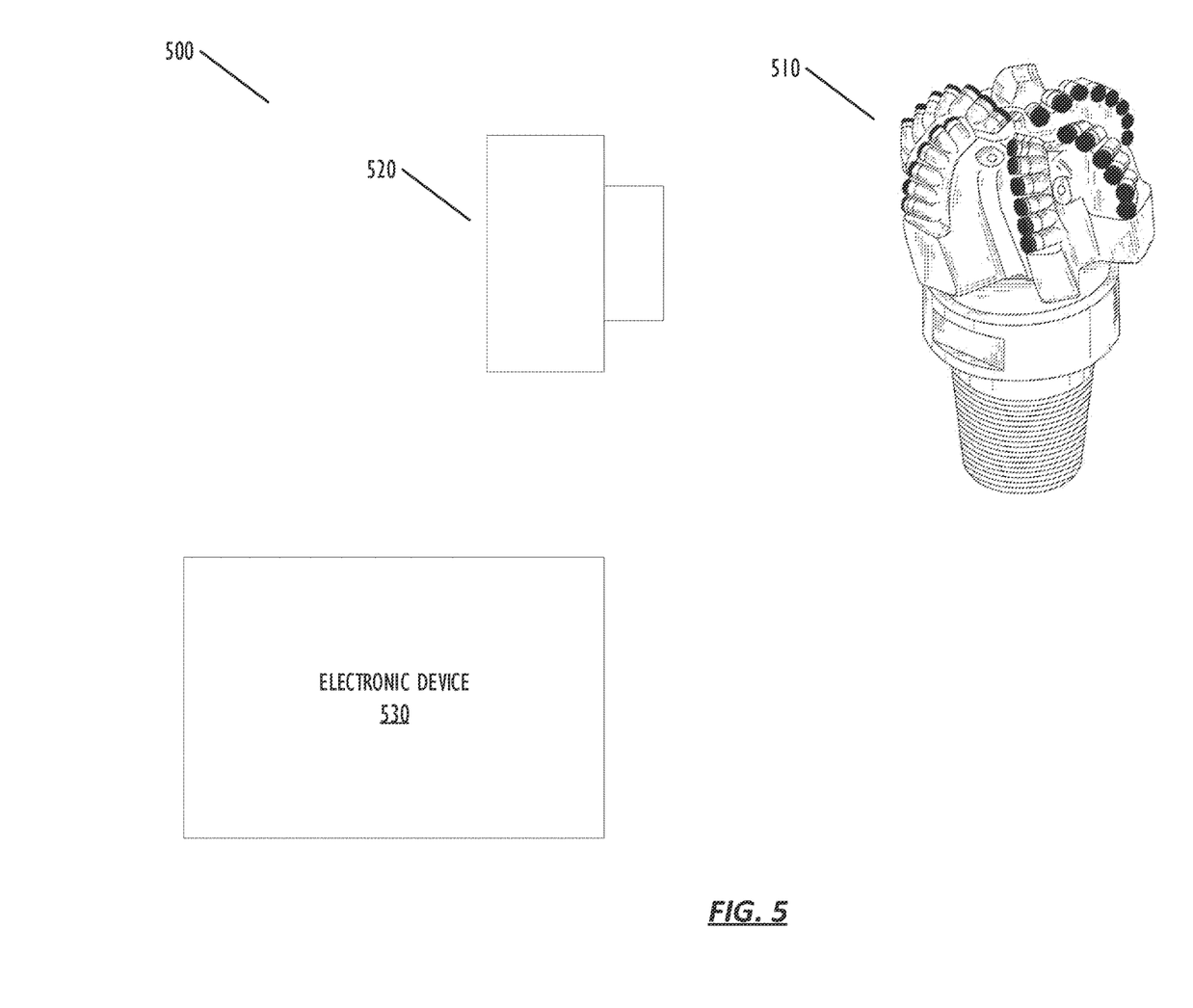
FIG. 5 shows an example setup of a three-dimensional (3D) scanning system for obtaining 3D data files representing the drill bit before and after use, according to one or more embodiments.

The processes for analyzing drill bit images 310A-310N using image processing and computer vision described herein with reference to FIGS. 3 and 4 do not require any additional imaging compared to traditional methods of determining wear characteristics of drill bits. However, additional imaging of the drill bit may yield additional insight into drill bit wear. FIG. 5 shows an example setup of a three-dimensional (3D) scanning system 500 for obtaining 3D data files representing the drill bit before and after use, according to one or more embodiments. As discussed previously, a 3D scanning system refers to any assembly by which distance data may be collected or calculated and reconstructed to extrapolate the shape of an object. Here, 3D scanning system 500 includes 3D scanner 520, electronic device 530, and drill bit 510. In some embodiments, the 3D scanner may be incorporated into electronic device 530. 3D scanner is calibrated by any appropriate means, such as by scanning a grid at different distances to determine pixel offset, white balance, and the like. In some embodiments, drill bit 510 is prepared for scanning using reflective markers to assist in stitching the 3D scan together, matting spray to remove reflective glare, and the like. 3D scanner 520 scans drill bit 510 such that the entire surface is scanned. In some embodiments, 3D scanner 520 is a handheld device that may be moved around drill bit 510. In other embodiments, drill bit 510 is placed on a rotating platform and rotated at a constant rate while 3D scanner 520 remains stationary. The scanning data is then sent from 3D scanner 520 to electronic device 530 for reconstruction and extrapolation of the shape of drill bit 510. In some embodiments, electronic device 530 calculates distance data before reconstruction and extrapolation of the drill bit shape in a data file representing the 3D drill bit shape.

Figure 6:
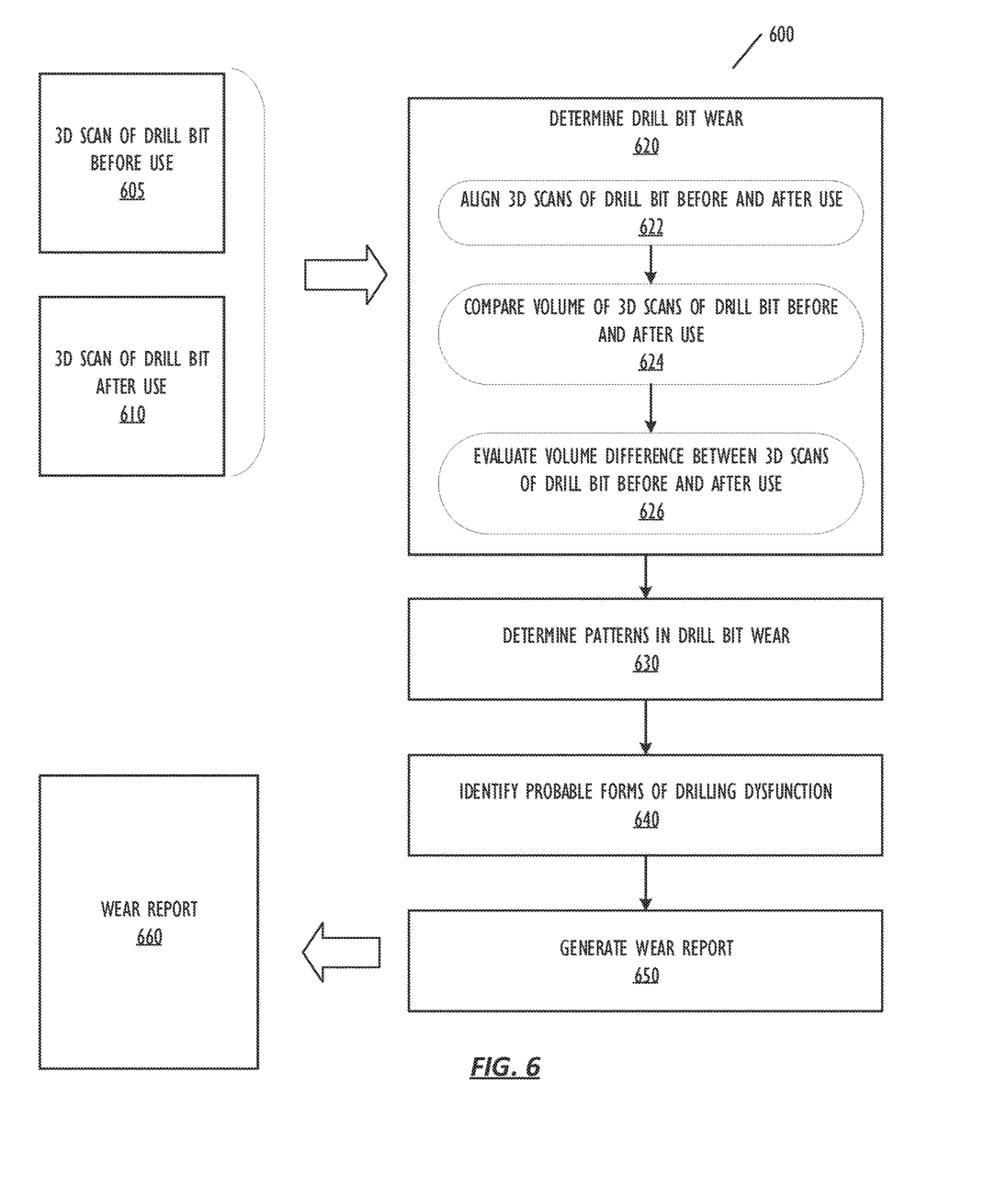
FIG. 6 shows an example process of 3D scan analysis to determine drill bit wear, according to one or more embodiments.

FIG. 6 shows an example process 600 of 3D scan analysis to determine drill bit wear, according to one or more embodiments. A 3D image analysis module obtains a 3D scan of a particular drill bit before use 605 and a 3D scan of the particular drill bit after use 610 and determines drill bit wear based on the 3D scans at step 620. For example, the 3D scans 605 and 610 may be obtained using 3D scanning system 500. In some embodiments, the 3D scans 605 and 610 are watertight meshes that fill all gaps in the model regardless of size to simulate a solid body. In some embodiments, determining drill bit wear at step 620 includes steps 622, 624, and 626. At step 622, the 3D image analysis module aligns the 3D scans of the drill bit before use 605 and after use 610. The 3D scan of drill bit after use 610 may show the drill bit translated or rotated compared to the 3D scan of drill bit before use 605. Aligning the 3D scans eases identification of wear characteristics. Any appropriate method for aligning the 3D scans may be used, such as the iterative closest point method and the like. At step 624, the 3D image analysis module compares the volumes of the 3D scan of drill bit before use 605 and 3D scan of drill bit after use 610. Drill bit wear reduces the volume of the drill bit. This reduced volume due to drill bit wear is apparent in a comparison of the 3D scan of drill bit before use 605 and 3D scan of drill bit after use 610. At step 626, the 3D image analysis module evaluates the difference in volume due to drill bit wear to determine drill bit wear metrics, such as mass, volume, surface area, mass moments of inertia, centers of mass, and the like.

At step 630, the 3D image analysis module determines patterns in the drill bit wear determined in step 620. As described previously with reference to FIG. 3, the 3D image analysis module may sort the volume differences due to drill bit wear into regions and calculate any number of wear metrics. At step 640, the 3D image analysis module identifies probable forms of drilling dysfunction and other less than optimal drilling conditions based on the patterns of drill bit wear determined in step 630. For example, if at step 630 the 3D image analysis module determines the drill bit has moderate wear in the gauge region, the probable form of drilling dysfunction it will identify in step 640 is whirl. At step 650, the 3D image analysis module generates a wear report 660 for the drill bit. In some embodiments wear report 660 includes a header summarizing key metadata about the drill bit, ranked distributions of wear in each region, 3D scans of drill bit before use 605 and after use 610, and the difference in volume due to drill bit wear. As described previously with reference to FIG. 3, in some embodiments the header includes the drill bit make, model, and serial number, the depth drilled, the start and stop dates and times, the configuration of drilling parameters used, expected lithology, and the like. Wear report 660 may be any format for ease of integration and analysis with other drilling data.

Figure 7:
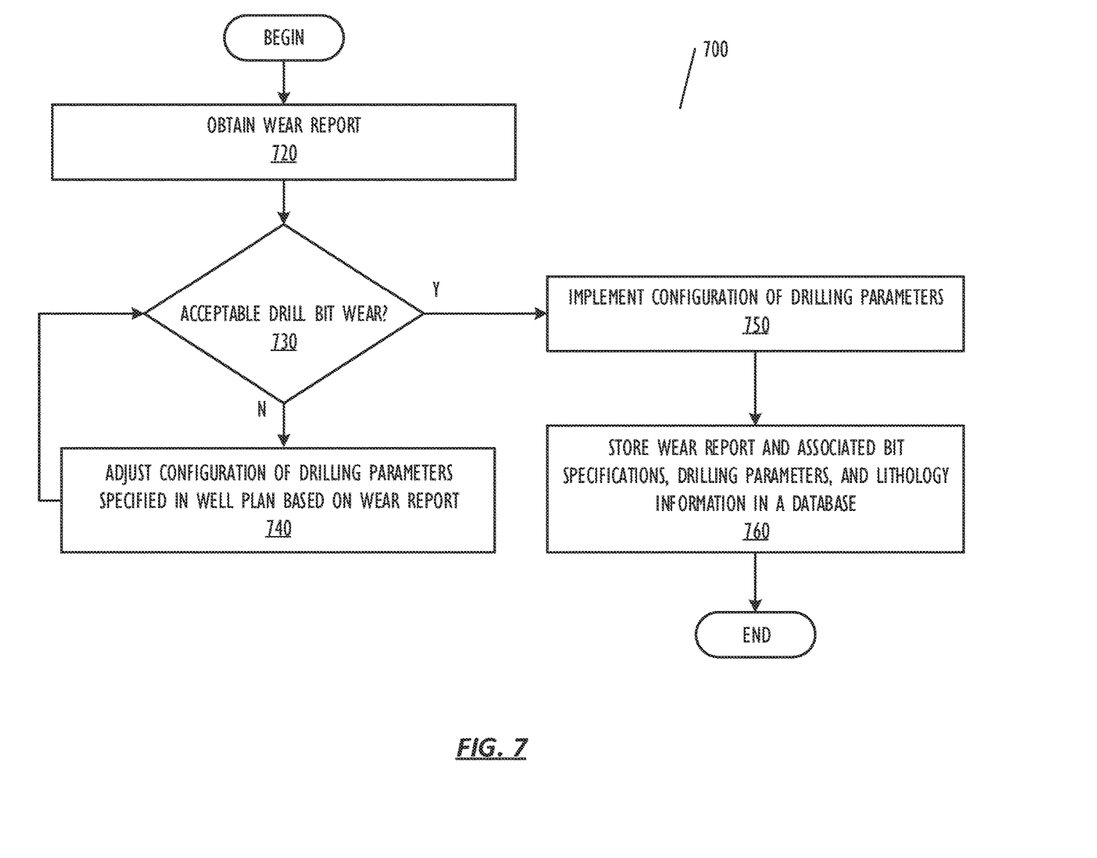
FIG. 7 shows an example process for drilling parameter adjustment based on drill bit wear, according to one or more embodiments.

FIG. 7 shows, in flow chart form, an example process 700 for drilling parameter adjustment based on drill bit wear, according to one or more embodiments. A drilling parameter adjustment module obtains a wear report at step 720. The drilling parameter adjustment module may obtain a wear report using any appropriate means. In some embodiments, the drilling parameter adjustment module obtains a wear report 360 from an image processing module performing the example process 300 for analyzing the captured images of the drill bit 310A-310N to determine drill bit wear as described herein with reference to FIG. 3. In some embodiments, the drilling parameter adjustment module obtains a wear report 460 from a computer vision module performing the example process 400 for analyzing drill bit images 310A-310N using computer vision to determine drill bit wear as described herein with reference to FIG. 4. In some embodiments, the drilling parameter adjustment module obtains a wear report 660 from a 3D image analysis module performing the example process 600 of 3D scan analysis to determine drill bit wear as described herein with reference to FIG. 6. In other embodiments, the drilling parameter adjustment module obtains a wear report from each of an image processing module, a computer vision module, and a 3D image analysis module, and uses all three wear reports in subsequent steps of process 700.

At step 730, the drilling parameter adjustment module determines whether the drill bit wear described in the wear report meets or exceeds a threshold of acceptable drill bit wear. The threshold of acceptable drill bit wear may be selected based on the wellbore characteristics, drilling tool characteristics, business considerations (e.g., cost to implement adjustments to drilling parameters), and the like. If the drill bit wear described in the wear report exceeds the threshold of acceptable drill bit wear, the drilling parameter adjustment module adjusts the configuration of drilling parameters specified in the well plan based on the wear report at step 740. For example, if the wear report indicates whirl is a probable drilling dysfunction present during use of the drill bit, the drilling parameter adjustment module determines adjustments to drilling parameters to reduce the likelihood of whirl. Then, the drilling parameter adjustment module returns to step 730 and determines if the adjustments to the configuration of drilling parameters reduce expected wear on a drill bit to within the threshold of acceptable drill bit wear. For example, the drilling parameter adjustment module uses a model of drill bit wear to predict expected drill bit wear under the adjusted configuration of drilling parameters. If the drill bit wear described in the wear report or expected drill bit wear based on the adjusted configuration of drilling parameters is within the threshold of acceptable drill bit wear, the drilling parameter adjustment module implements the configuration of drilling parameters at step 750. Where the drill bit wear described in the wear report is within the threshold of acceptable drill bit wear, the drilling parameter adjustment module implements the configuration of drilling parameters specified in the well plan without adjustments. Where the drill bit wear described in the wear report exceeds the threshold of acceptable drill bit wear, the drilling parameter adjustment module implements the adjusted configuration of drilling parameters that results in expected drill bit wear within the threshold of acceptable drill bit wear. Whether the drilling parameter adjustment module adjusts the configuration of drilling parameters or implements them as-is, it stores the wear report and associated drill bit specifications, configuration of drilling parameters during use of the drill bit, and lithology information in a database at step 760. When the database reaches a threshold number of entries, a model of drill bit wear may be generated. The threshold number of entries in the database may depend on the method of generating the model of drill bit wear.

Figure 8:
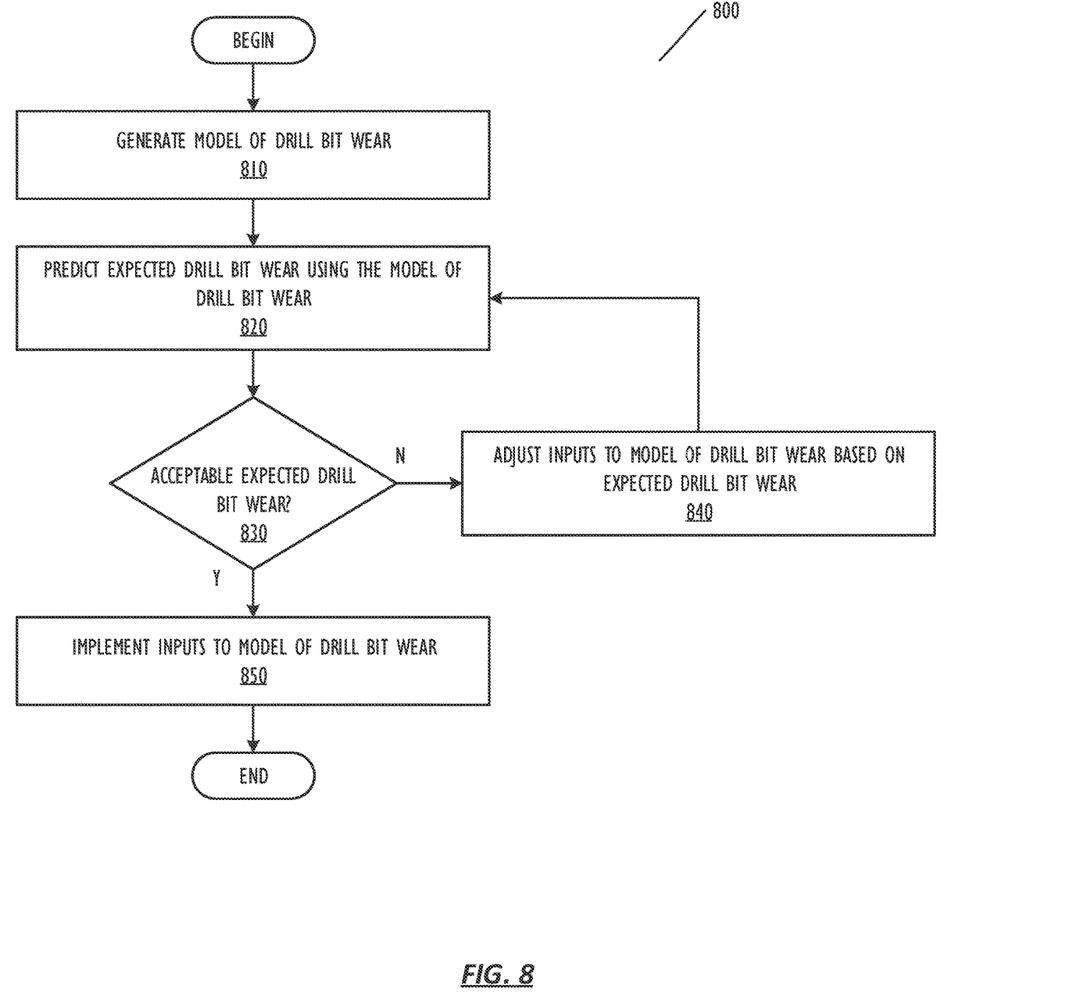
FIG. 8 shows an example process for generation and use of a model of drill bit wear, according to one or more embodiments.

FIG. 8 shows an example process 800 for generation and use of a model of drill bit wear, according to one or more embodiments. In some embodiments, example process 800 is performed by the drilling parameter adjustment module described herein with reference to FIG. 7. The drilling parameter adjustment module generates the model of drill bit wear using any appropriate means at step 810. In some embodiments, the drilling parameter adjustment module uses a database of wear reports and associated drill bit specifications, configuration of drilling parameters during use of the drill bits, and lithology information, such as the one described herein with reference to step 760 in FIG. 7, to generate the model of drill bit wear. The database entries may be filtered to remove outliers or erroneous entries and sorted into categories based on drilling activity, such as rotary drilling, slide drilling, circulation activities, and the like. The database entries may then be used to train one or more machine learning modules to model drill bit wear. In some embodiments, a portion of the database entries are withheld from training the machine learning modules and used to test the model of drill bit wear. The model of drill bit wear is tested by inputting the associated drill bit specifications, configuration of drilling parameters during use of the drill bit, and lithology information to the machine learning modules and receiving a prediction of drill bit wear based on the model of drill bit wear. The predicted drill bit wear is compared to the actual drill bit wear and until the model of drill bit wear reaches a threshold level of accuracy, the model of drill bit wear is adjusted by any appropriate means, such as with additional training, improved outlier filtering, and the like.

When the model of drill bit wear reaches the threshold level of accuracy, the drilling parameter adjustment module continues to step 820, where it predicts expected drill bit wear using the model of drill bit wear generated in step 810. In some embodiments, the drilling parameter adjustment module inputs the specifications of the drill bit to be used, the configuration of drill bit parameters to be used, and the expected lithology to the machine learning modules. The machine learning modules use the inputs and the model of drill bit wear to predict expected drill bit wear. At step 830, the drilling parameter adjustment module determines whether the expected drill bit wear meets or exceeds a threshold of acceptable drill bit wear. The threshold of acceptable drill bit wear may be selected based on wellbore characteristics, drill bit characteristics, business considerations, and the like, as described herein with references to FIG. 7. In some embodiments, the drilling parameter adjustment module also checks the accuracy of the expected drill bit wear at step 830, using any appropriate means. For example, the drilling parameter adjustment module may compare the inputs to the machine learning modules to similar data entries in the database and determine the expected drill bit wear is within a certain range from the wear recorded in the similar data entries. If the expected drill bit wear exceeds the threshold of acceptable drill bit wear, the drilling parameter adjustment module adjusts one or more conditions under which the prediction of expected drill bit wear was made at step 840. In some embodiments, the drilling parameter adjustment module adjusts one or more inputs to the machine learning modules. For example, the drilling parameter adjustment module may substitute the specifications of the current drill bit to be used for specifications of another drill bit which may be used instead of the current drill bit. As another example, the drilling parameter adjustment module may adjust one or more drilling parameters in the configuration of drilling parameters to be used. If the expected drill bit wear indicates a particular drilling dysfunction is likely to occur, the drilling parameter adjustment module adjusts one or more drilling parameters to reduce the likelihood of that particular drilling dysfunction. Then, the drilling parameter adjustment module repeats steps 820 and 830 using the adjusted inputs to the machine learning modules. The drilling parameter adjustment module iterates through steps 820-840 until the expected drill bit wear is within the threshold of acceptable drill bit wear. Once it is, the drilling parameter adjustment module proceeds to step 850, where it implements the conditions under which the acceptable expected drill bit wear was predicted without further adjustment. If the initial expected drill bit wear is within the threshold of acceptable drill bit wear, without requiring adjustments to the initial inputs to the model of drill bit wear and repeated iteration through steps 820-840, the drilling parameter adjustment module implements the initial conditions under which the prediction of the initial expected drill bit wear was made without adjustment at step 850.

The process for drilling parameter adjustment based on drill bit wear described herein as example process 700 in reference to FIG. 7 and the process for generation and use of a model of drill bit wear described herein as example process 800 in reference to FIG. 8 may also be used during design of a drill bit. The wear experienced by a particular design iteration of a drill bit may be used to adjust the specifications of the next design iteration of the drill bit to improve the resulting drill bit's performance using example process 700. Example process 800 may be used to improve design specifications of a drill bit without requiring manufacture of each design iteration of the drill bit. Example process 800 allows instant revision of design specifications based on the expected drill bit wear.

Figure 9:
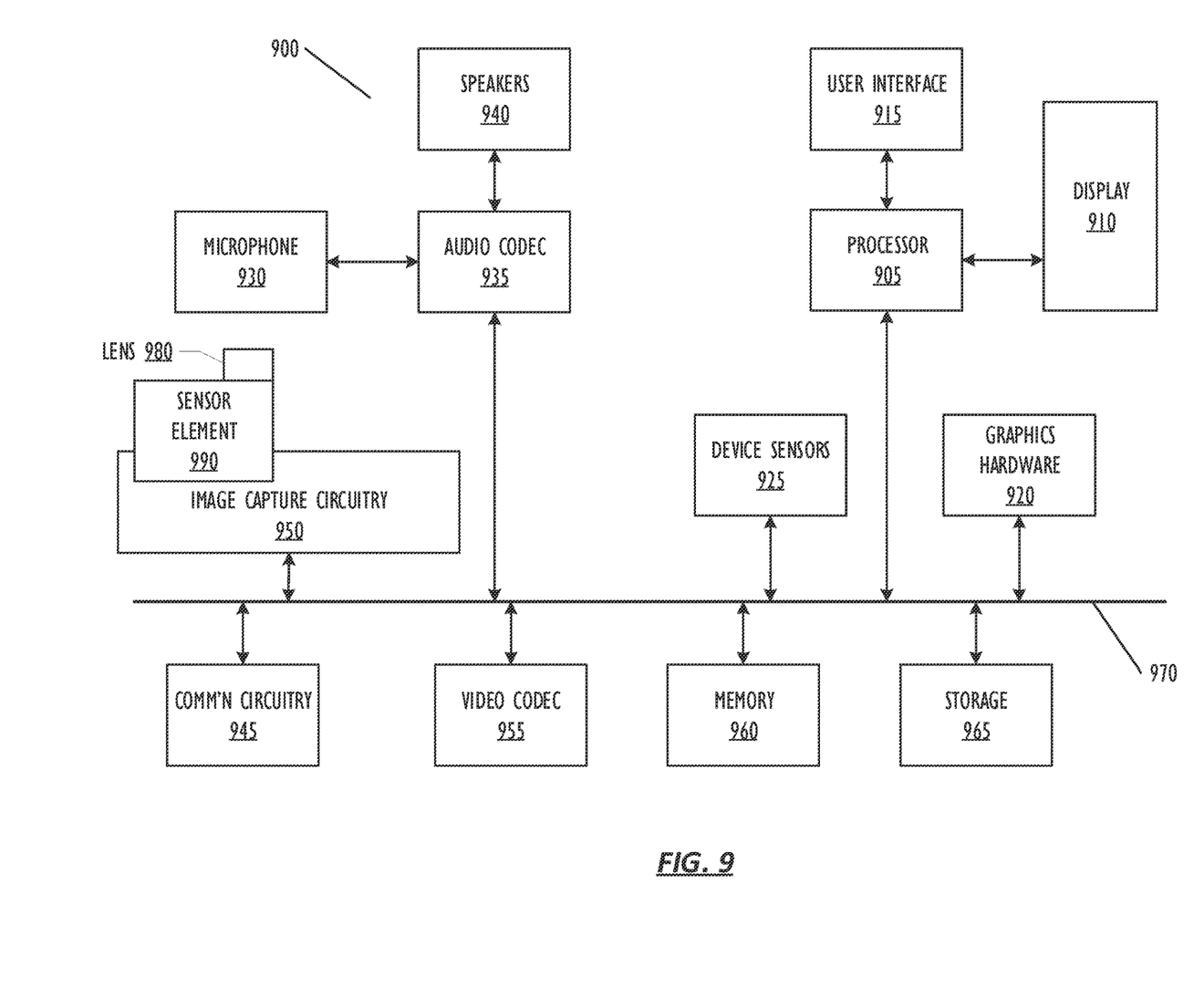
FIG. 9 shows, in block diagram form, a simplified multifunctional electronic device according to one or more embodiments.

Referring now to FIG. 9, a simplified functional block diagram of illustrative multifunction device 900 is shown according to one embodiment. Multifunction electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture circuitry 950, video codec(s) 955 (e.g., in support of digital image capture unit 950), memory 960, storage device 965, and communications bus 970. Multifunction electronic device 900 may be, for example, a personal electronic device such as a personal digital assistant (PDA), mobile telephone, or a tablet computer.

Processor 905 may execute instructions necessary to carry out or control the operation of many functions performed by device 900 (e.g., such as the prediction of drill bit wear as disclosed herein). Processor 905 may, for instance, drive display 910 and receive user input from user interface 915. User interface 915 may allow a user to interact with device 900. For example, user interface 915 can take a variety of forms, such as a button, keypad, dial, a click wheel, keyboard, display screen and/or a touch screen. Processor 905 may also, for example, be a system-on-chip such as those found in mobile devices and include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include a programmable GPU.

Image capture circuitry 950 may include lens 980. Lens assembly may have an associated sensor element 990. Image capture circuitry 950 may capture three-dimensional, still and/or video images. Output from image capture circuitry 950 may be processed, at least in part, by video codec(s) 955 and/or processor 905 and/or graphics hardware 920, and/or a dedicated image processing unit or pipeline incorporated within circuitry 950. Images so captured may be stored in memory 960 and/or storage 965. Microphone 930 may capture audio recordings that may be processed, at least in part, by audio codec(s) 935 and/or processor 905. Audio recordings so captured may be stored in memory 960 and/or storage 965.

Memory 960 may include one or more different types of media used by processor 905 and graphics hardware 920 to perform device functions. For example, memory 960 may include memory cache, read-only memory (ROM), and/or random access memory (RAM). Storage 965 may store media (e.g., audio, image and video files), preference information, device profile information, and any other suitable data. Storage 965 may store computer program instructions or software such as the image processing module described herein with reference to FIG. 3, the computer vision module described herein with reference to FIG. 4, the 3D image analysis module described herein with reference to FIG. 6, and/or the drilling parameter adjustment module described herein with reference to FIGS. 7 and 8. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to tangibly retain computer program instructions or code organized into one or more modules and written in any desired computer programming language. When executed by, for example, processor 905 such computer program code may implement one or more of the processes described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, implemented with one or more processors and a scanning system, for a drill bit used in drilling for formation hydrocarbons, the method comprising:
   identifying, at the one or more processors, one or more wear characteristics of the drill bit by analyzing, at the one or more processors, a first three dimensional (3D) scan of the drill bit generated through scanning before use and a second 3D scan of the drill bit generated through scanning after use;
   identifying, at the one or more processors, a drilling dysfunction present during use of the drill bit that produced the one or more wear characteristics;
   adjusting, at the one or more processors, at least one of penetration rate and torque in an adjustment of one or more drill operating parameters under which the drill bit is to be used;
   determining, using a model, that the adjustment produces one or more wear characteristics of the drill bit within a first threshold for acceptable drill bit wear;
   adjusting a well plan based on the determination; and
   controlling an operation of the drill bit based on the adjusted well plan to reduce the drilling dysfunction.

2. The method of claim 1, wherein identifying the one or more wear characteristics of the drill bit by analyzing comprises:
   identifying one or more individual cutters of the drill bit;
   classifying a location of each of the one or more individual cutters; and
   calculating a percent volume loss due to wear for each of the one or more individual cutters based on an expected representation of each cutter and an actual representation of each cutter.

3. The method of claim 1, wherein identifying the one or more wear characteristics of the drill bit by analyzing comprises:
   identifying the one or more wear characteristics of the drill bit using one or more machine learning algorithms;
   eliminating false positives in the one or more wear characteristics; and
   eliminating overlapping ones of the one or more wear characteristics.

4. The method of claim 3, wherein the one or more machine learning algorithms comprise a region-focused neural network for each of the one or more wear characteristics, wherein each region-focused neural network is trained to identify a respective one of the one or more wear characteristics.

5. The method of claim 3, wherein eliminating the false positives in the one or more wear characteristics further comprises:
   comparing confidence scores associated with each of the one or more wear characteristics to a second threshold for minimum acceptable confidence level; and
   eliminating each of the one or more wear characteristics associated with a respective one of the confidence scores that does not meet the second threshold for minimum acceptable confidence level.

6. The method of claim 3, wherein eliminating the overlapping ones of the one or more wear characteristics further comprises:
   calculating a set of overlap ratios, wherein the set of overlap ratios includes an overlap ratio for each of the one or more wear characteristics with every other wear characteristic from the one or more wear characteristics;
   comparing each overlap ratio in the set of overlap ratios to a third threshold for maximum acceptable overlap ratio; and
   eliminating, for each overlap ratio that does not meet the third threshold for maximum acceptable overlap ratio, the wear characteristic associated with a lower confidence score compared to the confidence score associated with the other wear characteristic.

7. The method of claim 1, wherein analyzing the first 3D scan of the drill bit before use and the second 3D scan of the drill bit after use comprises:
   generating the first 3D scan of the drill bit before use, wherein the drill bit before use is coated in a matting agent such that the drill bit is not reflective, and the drill bit before use is labeled with reflective markers to orient the first 3D scan; and
   generating the second 3D scan of the drill bit after use, wherein the drill bit after use is coated in the matting agent such that the drill bit is not reflective, and the drill bit after use is labeled with the reflective markers to orient the second 3D scan.

8. The method of claim 1, wherein analyzing the first and second 3D scans of the drill bit to identify the one or more wear characteristics of the drill bit further comprises:
   aligning the first 3D scan of the drill bit and the second 3D scan of the drill bit;
   calculating a volume difference between a first volume of the first 3D scan of the drill bit and a second volume of the second 3D scan of the drill bit; and
   evaluating the volume difference to identify the one or more wear characteristics of the drill bit.

9. The method of claim 1, wherein analyzing the first 3D scan of the drill bit before use and the second 3D scan of the drill bit after use comprises scanning the drill bit with a scanner as an internal component of the one or more processors or as a separate external component connected to the one or more processors.

10. The method of claim 9, wherein scanning with the scanner comprises using the scanner selected from the group consisting of a handheld device, a stationary device, a contact scanner, a triangulation scanner, and a structured light scanner.

11. The method of claim 1, wherein identifying the drilling dysfunction present during use of the drill bit that produced the one or more wear characteristics comprises:
   identifying wear from the analyzing;
   identifying one or more drilling conditions indicative of producing the identified wear; and
   identifying at least one of the penetration rate and the torque indicative of generating the one or more drilling conditions.

12. The method of claim 11, wherein the steps of adjusting and determining comprises:
   determining that the identified wear exceeds the first threshold; and
   adjusting the at least one of the penetration rate and the torque of the one or more drill operating parameters to generate the one or more drilling conditions producing predicted wear to meet the first threshold.

13. The method of claim 12, further comprising:
modelling the predicted wear expected under the at least one of the penetration rate and the torque of the one or more drill operating parameters; and
implementing the at least one of the penetration rate and the torque of the one or more drill operating parameters associated with the predicted wear within the first threshold of the acceptable drill bit wear.

14. The method of claim 1, wherein determining, using the model, that the adjustment produces the one or more wear characteristics of the drill bit within the first threshold for the acceptable drill bit wear comprises:
calculating a first expected drill bit wear based on the model of drill bit wear and the at least one of penetration rate and torque in the adjustment under which the drill bit is to be used;
generating a first of the one or more wear characteristics for the drill bit based on the first expected drill bit wear; and
comparing the first of the one or more wear characteristics to the first threshold for the acceptable drill bit wear.

15. The method of claim 14, further comprising:
determining, using the model, that the first of the one or more wear characteristics falls outside the first threshold for the acceptable drill bit wear;
adjusting, at the one or more processors, at least one of the penetration rate and the torque in another adjustment of the one or more drill operating parameters under which the drill bit is to be used;
calculating a second expected drill bit wear based on the model of drill bit wear and the at least one of the penetration rate and the torque in the other adjustment under which the drill bit is to be used;
generating a second of the one or more wear characteristics for the drill bit based on the second expected drill bit wear; and
comparing the second of the one or more wear characteristics of the drill bit to the first threshold for the acceptable drill bit wear.

16. A system for a drill bit used in drilling for formation hydrocarbons, the system comprising:
one or more processors; and
a memory coupled to the one or more processors and storing instructions executable by the one or more processors to cause the system to:
analyze a first three-dimensional (3D) scan of the drill bit generated through scanning before use and a second 3D scan of the drill bit generated through scanning after use to identify one or more wear characteristics of the drill bit based on the analysis;
identify a drilling dysfunction present during use of the drill bit that produced the one or more wear characteristics;
adjust at least one of penetration rate and torque in an adjustment of one or more drill operating parameters under which the drill bit is to be used;
determine, using a model, that the adjustment produces one or more wear characteristics of the drill bit within a first threshold for acceptable drill bit wear; and
adjust a well plan based on the determination; and
control an operation of the drill bit based on the adjusted well plan to reduce the drilling dysfunction in drilling for the formation hydrocarbons.

17. A non-transitory computer readable medium comprising instructions executable by one or more processors to:
analyze a first three-dimensional (3D) scan of a drill bit generated through scanning before use and a second 3D scan of the drill bit generated through scanning after use to identify one or more wear characteristics of the drill bit based on the analysis;
identify a drilling dysfunction present during use of the drill bit that produced the one or more wear characteristics;
adjust at least one of penetration rate and torque in an adjustment of one or more drill operating parameters under which the drill bit is to be used;
determine, using a model, that the adjustment produces one or more wear characteristics of the drill bit within a first threshold for acceptable drill bit wear;
adjust a well plan based on the determination; and
control an operation of the drill bit based on the adjusted well plan to reduce the drilling dysfunction.

* * * * *